United States Patent
Jaradi et al.

(10) Patent No.: US 10,183,603 B2
(45) Date of Patent: Jan. 22, 2019

(54) ARMREST WITH DEPLOYABLE CUP HOLDER

(71) Applicant: FORD GLOBAL TECHNOLOGIES, LLC, Dearborn, MI (US)

(72) Inventors: Dean M. Jaradi, Macomb, MI (US); Mohammed Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 15/006,591

(22) Filed: Jan. 26, 2016

(65) Prior Publication Data

US 2017/0210255 A1      Jul. 27, 2017

(51) Int. Cl.
*B60N 3/10* (2006.01)
*B60N 2/75* (2018.01)
*A47C 7/68* (2006.01)

(52) U.S. Cl.
CPC ............... *B60N 3/102* (2013.01); *B60N 2/79* (2018.02); *A47C 7/68* (2013.01)

(58) Field of Classification Search
CPC .......... B60N 2/14–2/146; B60N 2/46–2/4693; B60N 2/4686; B60N 2/793; B60N 3/102; A47G 23/02; A47C 7/68
USPC ........................................ 297/188.17, 344.21
See application file for complete search history.

(56) References Cited

U.S. PATENT DOCUMENTS

| | | | |
|---|---|---|---|
| 4,417,764 A * | 11/1983 | Marcus ................. | B60N 3/102 108/44 |
| 4,759,584 A * | 7/1988 | Dykstra ................. | B60N 3/102 108/25 |
| 4,783,037 A * | 11/1988 | Flowerday ............. | B60N 3/102 248/311.2 |
| 5,072,989 A * | 12/1991 | Spykerman ............. | A47C 7/62 297/188.16 |
| 5,170,980 A * | 12/1992 | Burrows ................ | B60N 3/101 108/25 |
| 5,171,061 A * | 12/1992 | Marcusen ............ | B60N 2/4686 248/311.2 |
| 5,232,262 A | 8/1993 | Tseng | |
| 5,248,183 A | 9/1993 | Gignac et al. | |
| 5,259,580 A * | 11/1993 | Anderson ............. | B60N 3/102 224/926 |
| 5,524,958 A | 6/1996 | Wieczorek et al. | |
| 5,634,621 A * | 6/1997 | Jankovic ................ | B60N 3/102 224/926 |
| 5,673,891 A * | 10/1997 | Fujihara ................ | B60N 3/102 248/311.2 |

(Continued)

FOREIGN PATENT DOCUMENTS

CN         201484249 U      5/2010

OTHER PUBLICATIONS

English machine translation of CN201484249U.

*Primary Examiner* — David R Dunn
*Assistant Examiner* — Tania Abraham
(74) *Attorney, Agent, or Firm* — Vichit Chea; King & Schickli, PLLC

(57) ABSTRACT

An armrest is provided for a seat. That armrest includes a body and a deployable cup holder carried on the body. The deployable cup holder includes a translating base and an erectable well wall carried on the translating base. A seat assembly including an armrest is also disclosed.

9 Claims, 6 Drawing Sheets

(56) References Cited

U.S. PATENT DOCUMENTS

| | | | | |
|---|---|---|---|---|
| 5,762,307 | A | 6/1998 | Patmore | |
| 5,765,736 | A * | 6/1998 | Fischer | B60N 3/102 224/281 |
| 5,897,089 | A * | 4/1999 | Lancaster | B60N 3/102 224/926 |
| 5,909,926 | A * | 6/1999 | Gonzalez | B60N 2/143 297/301.4 |
| 8,056,980 | B2 * | 11/2011 | Koutsky | B60N 2/14 180/329 |
| 8,469,246 | B2 * | 6/2013 | Lee | B60N 3/102 224/282 |
| 8,695,843 | B1 | 4/2014 | Brinas | |
| 2002/0008415 | A1 * | 1/2002 | Bollaender | B60N 3/102 297/188.17 |
| 2005/0001127 | A1 * | 1/2005 | Schaal | B60N 3/102 248/311.2 |
| 2006/0061177 | A1 * | 3/2006 | Billger | A47C 3/18 297/344.21 |
| 2012/0319440 | A1 * | 12/2012 | Andersson | B60N 2/4613 297/188.17 |
| 2014/0299641 | A1 | 10/2014 | Brinas | |
| 2016/0059762 | A1 * | 3/2016 | Poirier | B60N 3/102 248/311.2 |

\* cited by examiner

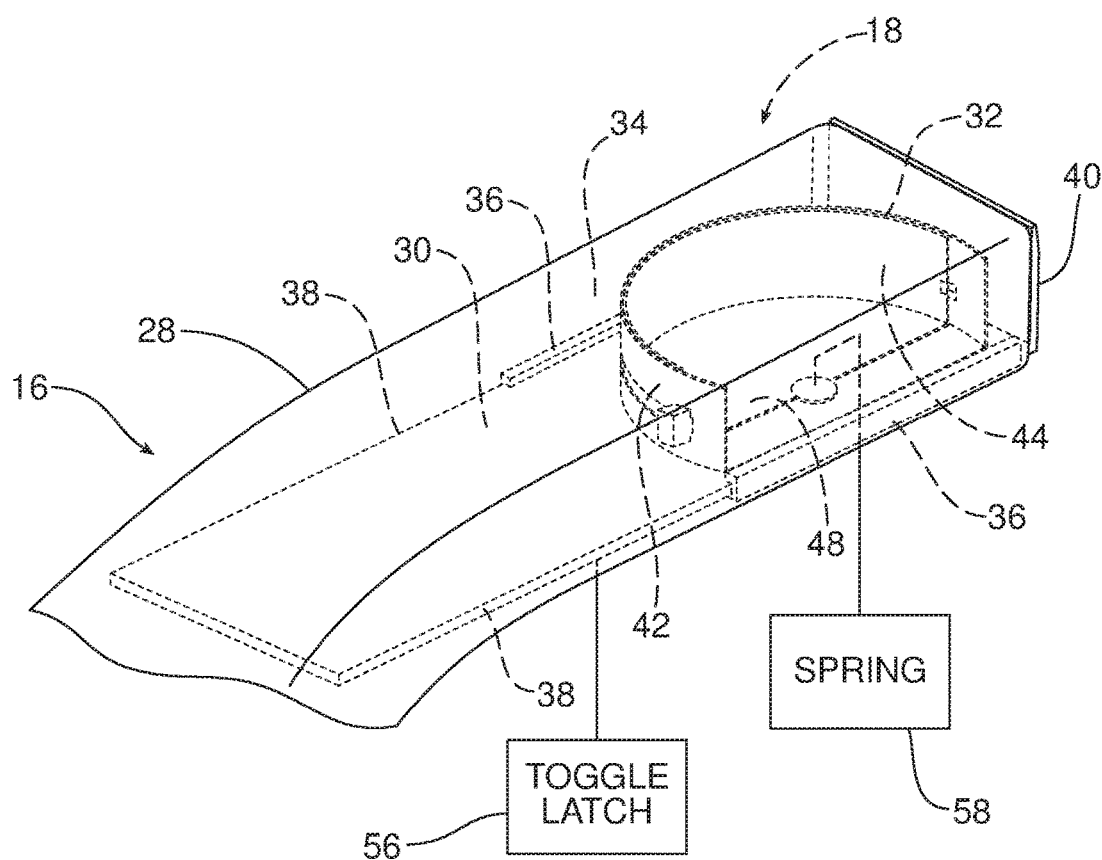

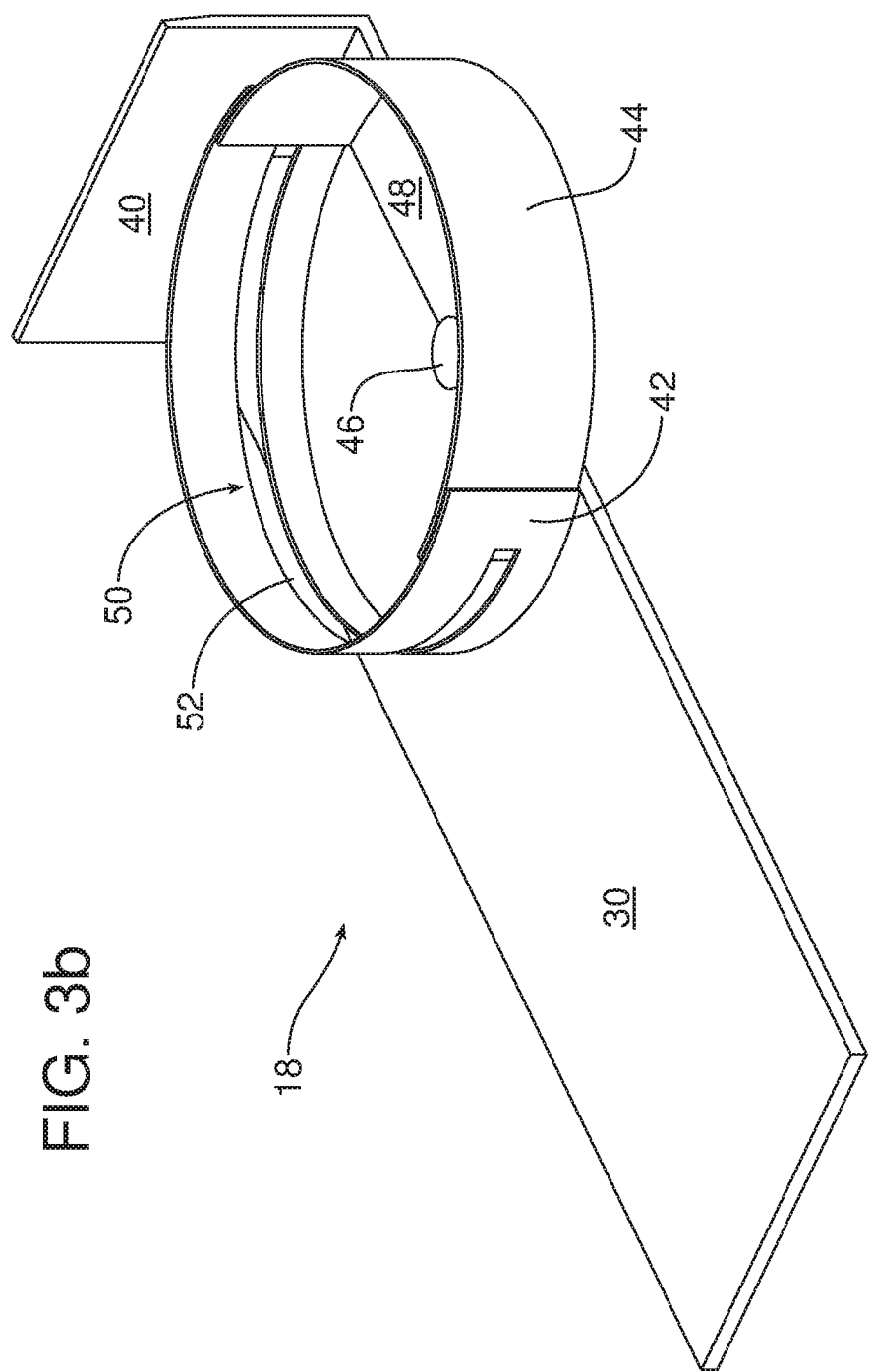

ARMREST WITH DEPLOYABLE CUP HOLDER

TECHNICAL FIELD

This document relates generally to the motor vehicle equipment field and, more particularly, to an armrest incorporating a deployable cup holder as well as to a motor vehicle seat including such an armrest.

BACKGROUND

Occupants in a motor vehicle desire to have cup holders located within convenient reach. In autonomous vehicles, rotatable seats pose a challenge to conveniently position cup holders within a comfortable, reachable distance of the vehicle passengers. More specifically, since the seat positions can change, cup holders on door trim or other fixed locations are not always conveniently located or readily accessible. In order to rectify this situation, a need is identified for an armrest for a motor vehicle seat incorporating a deployable cup holder as well as for a motor vehicle seat including such an armrest.

SUMMARY

In accordance with the purposes and benefits described herein, an armrest is provided for a seat such as a seat in a motor vehicle. That armrest may be described as comprising a body and a deployable cup holder carried on the body. The deployable cup holder includes a translating base and an erectable well wall carried on the translating base.

More specifically, the erectable well wall may include a first section fixed to the translating base and a second section pivotally attached to the translating base. That second section may be displaceable between a first position nested with the first section and a second position opposed to the first section and forming a cup well between the first section and the second section.

The second section may also include a bottom wall. Further, a pivot pin may be provided connecting the bottom wall to the translating base.

An elongated slot may be provided in the first section. Further, a guide tab may be carried on the second section with the guide tab being received and sliding in the elongated slot. This guide tab provides support for the second section when it is pivoted with respect to the first section between the first and second positions.

In one possible embodiment, the translating base slides along a first axis and the second section pivots about a second axis wherein the first axis is perpendicular to the second axis.

The body may also include a cavity and the translating base may slide into the cavity in a storage position and out of the cavity in a deployed position. In such an embodiment, the deployable cup holder is held within the cavity in the storage position and projects from the cavity in the deployed position.

The armrest may also include a guide track in the cavity and the translating base may include a slide received in the guide track. Further, the translating base may include a fascia forming at least a portion of a front face of the armrest when the translating base is in the storage position.

Still further, the armrest may include a toggling latch for securing the translating base in the storage position and releasing the translating base from the storage position. Still further, the armrest may include a spring for biasing the second section into the second position when the translating base is moved from the storage position to the deployed position.

In accordance with yet another aspect, a seat assembly is provided. That seat assembly comprises a seat back, a seat bottom and an armrest. That armrest includes a body and a deployable cup holder carried on the body. The deployable cup holder includes a translating base and an erectable well wall carried on the translating base.

The seat assembly may further include a rotating base that mounts the seat bottom to a frame of a motor vehicle. Further, the armrest may include a first portion, a second portion and a pivot joint connecting the first portion to the second portion. Such a hinged armrest may allow easier access to the seat assembly when being seated and easier egress upon rising from the seat assembly.

As previously noted, the erectable well wall of the seat assembly may include a first section fixed to the translating base and a second section pivotally attached to the translating base. That second section may be displaceable between a first position nested with the first section and a second position opposed to the first section and forming a cup well between the first section and the second section.

Further, the seat assembly, and more particularly, the armrest, may further include a toggling latch for securing the translating base in a storage position and releasing the translating base from the storage position. Further, the armrest may include a spring biasing the second section into the second position when the translating base is moved from the storage position to a deployed position.

In the following description, there are shown and described several preferred embodiments of the armrest and the seat assembly. As it should be realized, the armrest and the seat assembly are capable of other, different embodiments and their several details are capable of modification in various, obvious aspects all without departing from the armrest and seat assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the armrest and seat assembly and together with the description serve to explain certain principles thereof. In the drawing figures:

FIGS. 2a-2c are detailed schematical perspective views illustrating the deployable cup holder in respective stored, partially deployed, fully deployed positions.

FIGS. 3a and 3b are detailed perspective views illustrating the deployment of the second section of the erectable well wall and a completed cup well.

Reference will now be made in detail to the present preferred embodiments of the armrest and seat assembly, examples of which are illustrated in the accompanying drawing figures.

DETAILED DESCRIPTION

Figure 1:
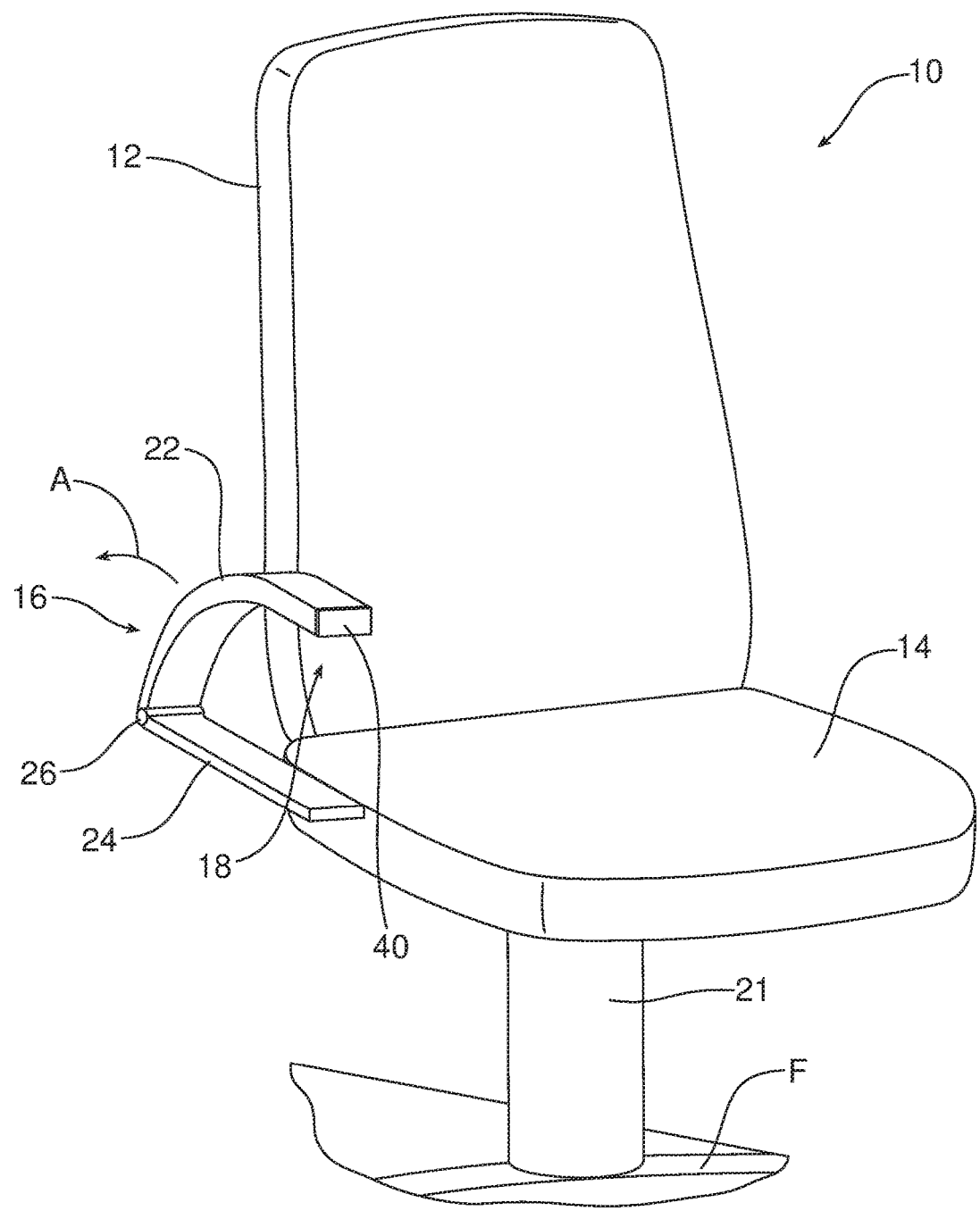
FIG. 1 is a perspective view of the seat assembly including a seat back, a seat bottom, an armrest and a deployable cup holder carried in the body of the armrest.

Reference is now made to FIG. 1 illustrating a seat assembly 10 for a motor vehicle. That seat assembly 10 includes a seat back 12 connected to a seat bottom 14 and an armrest 16 including a deployable cup holder generally designated by reference numeral 18. In FIG. 1, the deployable cup holder 18 is in the storage position concealed within a cavity 34 of the armrest 16 as best illustrated in FIG. 2a.

As further illustrated in FIG. 1, the seat assembly 10 includes a rotating base in the form of a post 21 that mounts the seat bottom 14 to the frame F of a motor vehicle. As further illustrated in FIG. 1, the armrest 16 includes a first portion 22 and a second portion 24 connected by means of a pivot joint 26 which allows the first portion 22, including the deployable cup holder 18, to be pivoted rearwardly (note action arrow A) and out of the way when one seeks to sit upon or rise from the seat assembly 10.

Reference is now made to FIGS. 2a-2c, 3a and 3b illustrating the deployable cup holder 18 in detail. As illustrated, the deployable cup holder 18 is carried on the body 28 of the armrest 16. That deployable cup holder 18 includes a translating base 30 and an erectable well wall 32 carried on the translating base.

The translating base 30 includes a slide 38 received in the opposed guide tracks or channels 36 provided within the cavity 34 of the armrest 16. In the illustrated embodiment, the slide 38 comprises the opposed edges of the translating base 30. A fascia 40 provided at the front of the translating base 30 forms at least a portion of a front face of the armrest 16 when the translating base 30 is in the storage position illustrated in FIG. 2a.

The erectable well wall 32 includes a first section 42 fixed to the translating base 30 and a second section 44 pivotally attached to the translating base 30 by means of the pivot pin 46. More specifically, the second section 44 includes a bottom wall 48 and the pivot pin 46 passes through an aperture (not shown) in the bottom wall thereby pivotally securing the second section to the translating base 30.

Figure 3A:
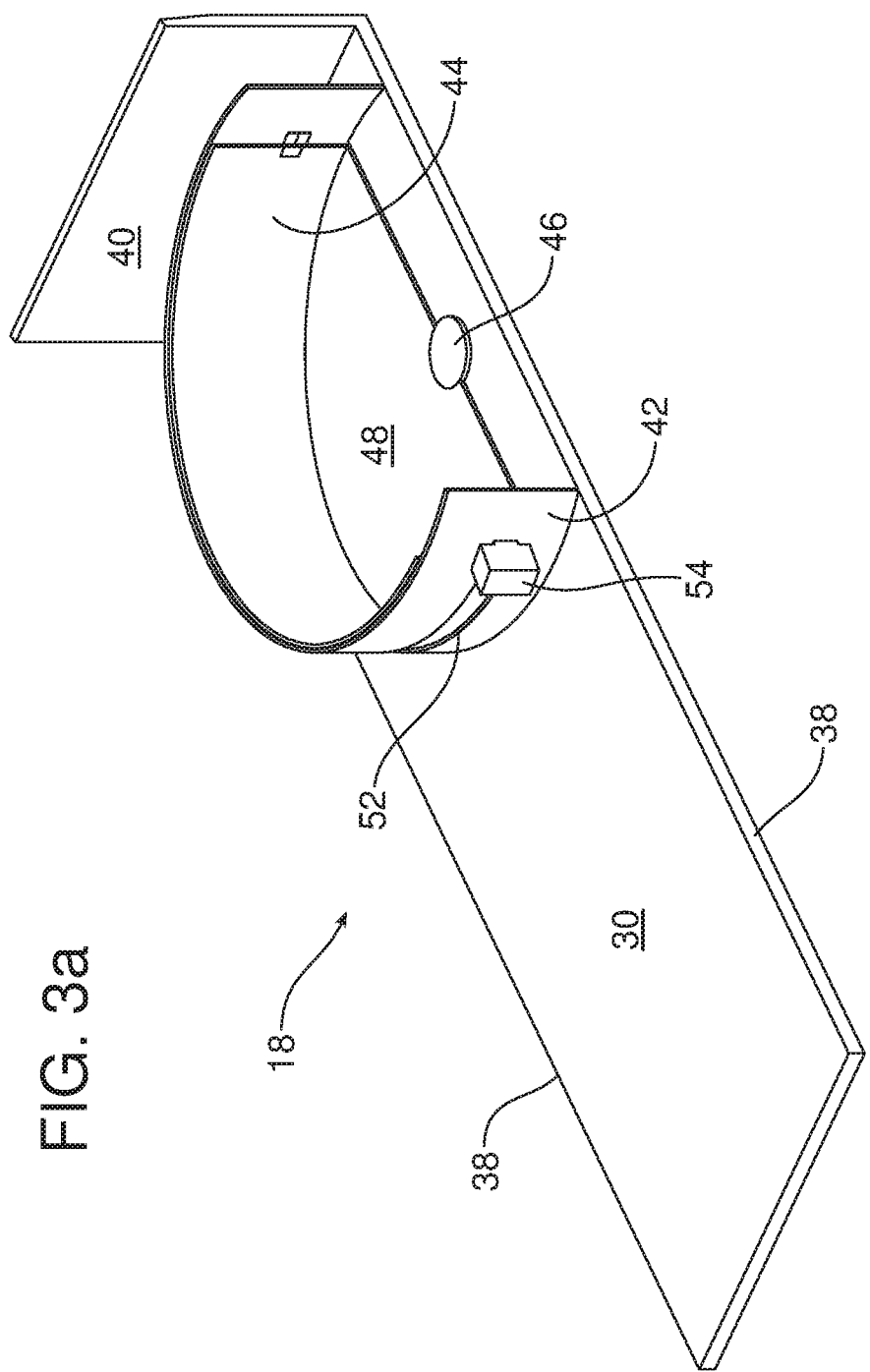

As best illustrated in FIGS. 3a and 3b, the second section 44 is displaceable, with respect to the translating base 30 and the fixed first section 42, between a first position nested with the first section (see FIG. 3a) and a second position opposed to the first section and forming a cup well 50 between the first and second sections (see FIG. 3b). In the illustrated embodiment, an elongated slot 52 is provided in the first section 42 and a guide tab 54 on the second section 44 is received in and slides along the elongated slot. Thus, the guide tab 54 helps to further support the second section 44 as it is displaced between the first and second positions illustrated in FIGS. 3a and 3b.

As illustrated in FIGS. 2a and 3a, when the deployable cup holder 18 is in the storage position, the second section 44 is nested with the first section 42 of the erectable well wall 32 and the translating base 30 is fully retracted within the cavity 34 of the armrest body 28.

Figure 2B:
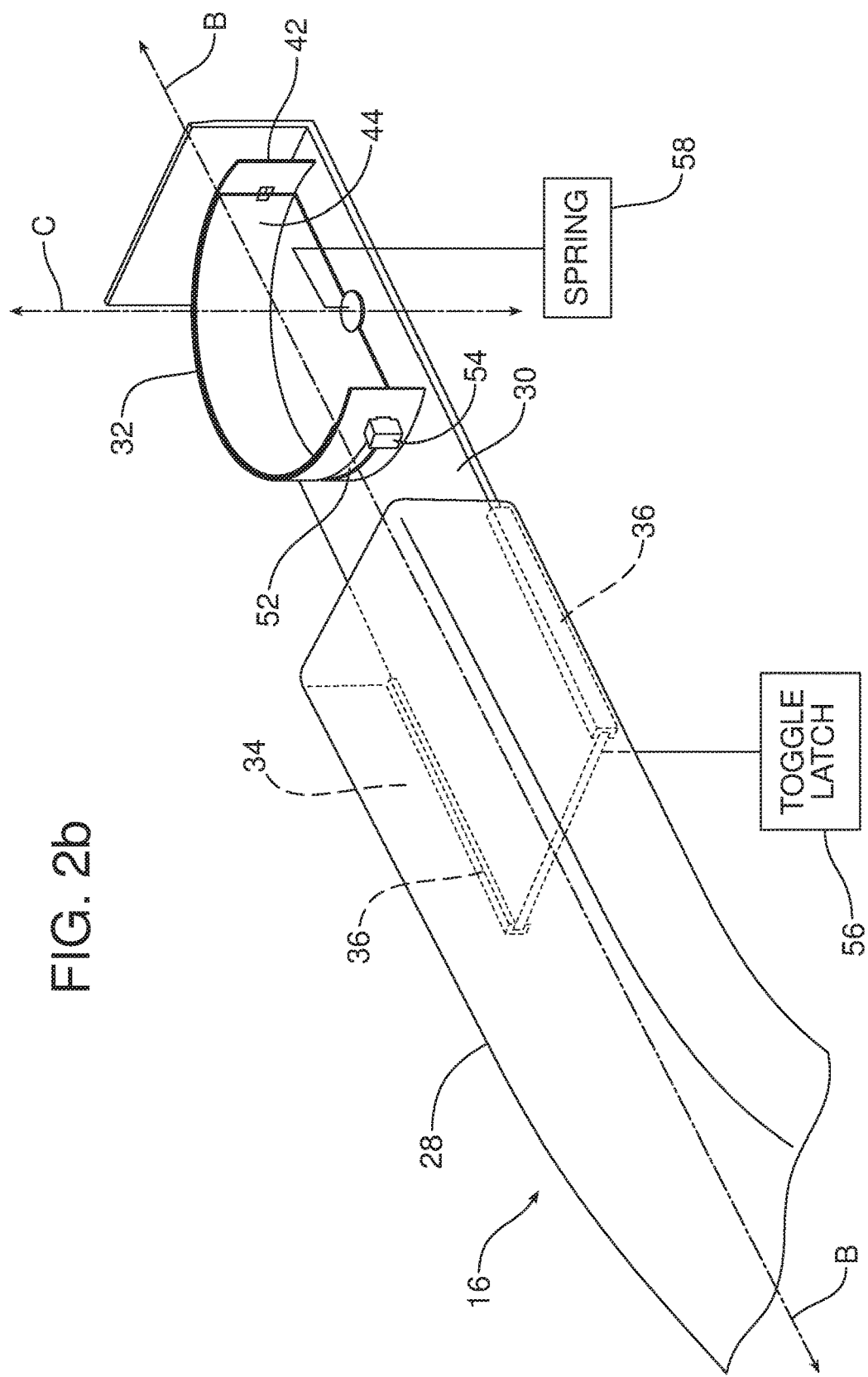
Figure 2C:
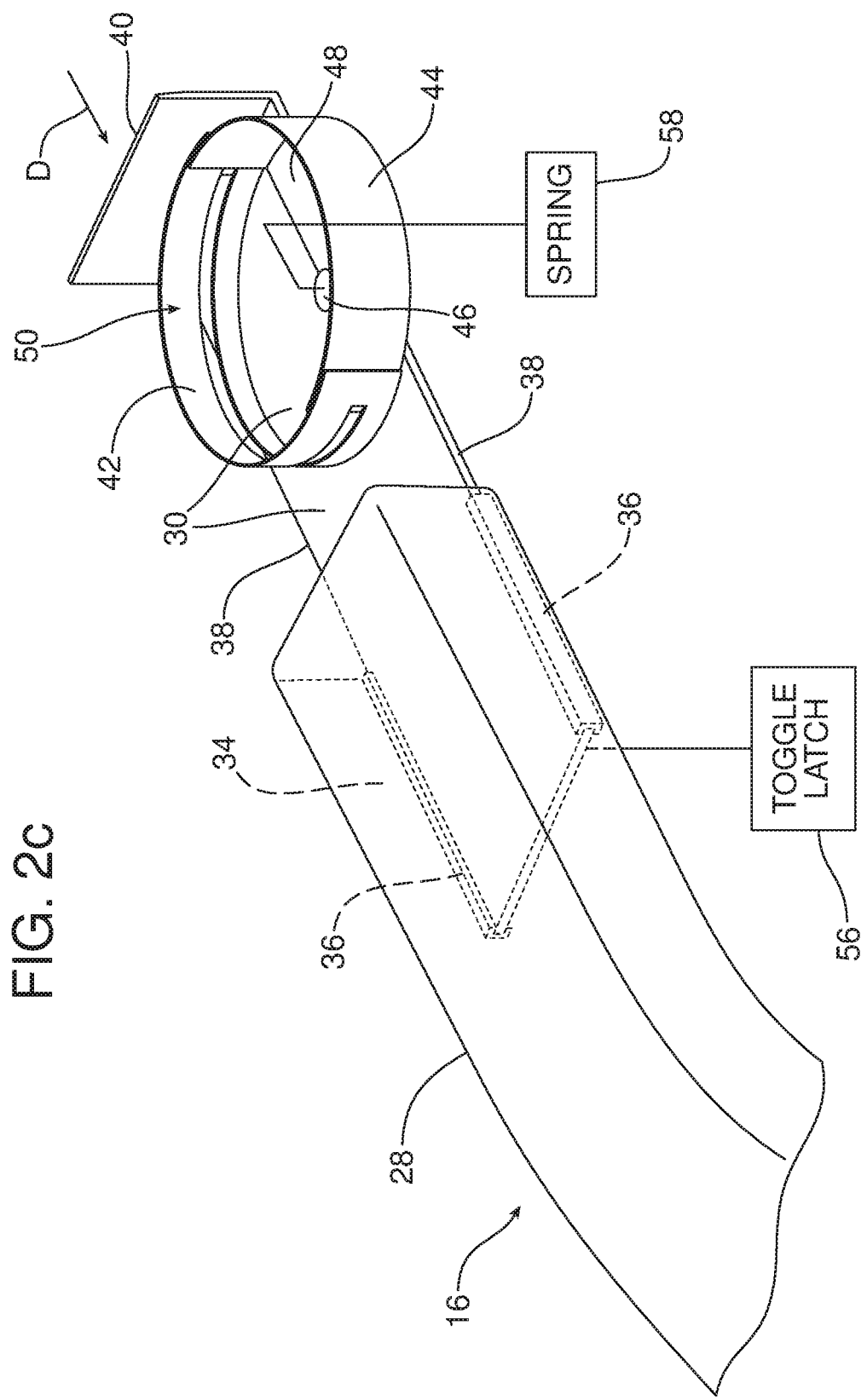

FIGS. 2c and 3b illustrate the deployable cup holder 18 in the fully deployed position wherein the translating base 30 projects from the cavity 34 in the armrest body 28 and the second section 44 is in the second position, opposed to the first section 42 thereby forming the fully erected cup well 50 for holding a cup, a bottle or the like. As should be appreciated, that cup well 50 includes a fully closed bottom wall. In the illustrated embodiment, that bottom wall is formed by the bottom wall 48 of the second section 44 and a portion of the translating base 30.

As should be appreciated from viewing FIG. 2b, the translating base 30 translates along an axis B while the second section 44 of the erectable well wall 32 pivots along a second axis C. In the illustrated embodiment, the first and second axes B, C are perpendicular to one another.

In the illustrated embodiment, the armrest 16 includes a toggling latch that is schematically illustrated at 56. That toggling latch 56 is of the push-to-lock and push-to-open type known to those skilled in the art. Thus, when one wishes to deploy the deployable cup holder 18, one pushes inward on the fascia 40 thereby releasing the latch and allowing deployment of the cup holder 18 as illustrated in FIGS. 2b and 2c.

An optional spring 58 such as a coil spring, may be provided around the pivot pin 46 to bias the second section 44 of the erectable well wall 32 from the first or stowed position illustrated in FIG. 3a to the second or erected position forming the cup well 50 as illustrated in FIG. 3b. Such a spring 58 may function to automatically deploy the second section 44 when the translating base 30 is moved into the fully deployed position illustrated in FIG. 2c.

When one wishes to once again store the deployable cup holder 18 within the cavity 34 in the armrest 16 one may push in the direction of action arrow D on the fascia 40. As the second wall 44 engages the body 16, the second wall is rotated about the pivot pin 46 against the biasing force of the spring 58 until the second wall nests with the first wall 42 sufficiently to allow the translating base 30 to be fully retracted into the cavity 34 and locked in the storage position by the toggling latch 56. As illustrated in FIGS. 1 and 2a, the deployable cup holder 18 is fully held within the cavity 34, completely out of sight, when in the storage position.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An armrest for a seat, comprising:
   a body;
   a deployable cup holder carried on said body, said deployable cup holder including a translating base and an erectable well wall carried on and extending vertically from said translating base, wherein said erectable well wall includes (a) a first section fixed to said translating base, (b) a second section, including a bottom wall, pivotally attached to said translating base, (c) an elongated slot in said first section, (d) a guide tab carried on said second section wherein said guide tab is received in said elongated slot and (e) a pivot pin connecting said bottom wall to said translating base and wherein said second section is displaceable between a first position nested with said first section and a second position opposed to said first section and forming a cup well between said first section and said second section.

2. The armrest of claim 1, wherein said translating base slides along a first axis and said second section pivots about a second axis wherein said first axis is perpendicular to said second axis.

3. The armrest of claim 2, wherein said body includes a cavity and said translating base slides into said cavity in a storage position and out of said cavity in a deployed position.

4. The armrest of claim 3, wherein said deployable cup holder is held within said cavity in said storage position and projects from said cavity in said deployed position.

5. The armrest of claim 4, wherein said armrest includes a guide track in said cavity and said translating base includes a slide received in said guide track.

6. The armrest of claim 5, wherein said translating base includes a fascia forming at least a portion of a front face of said armrest.

7. The armrest of claim 6, further including a toggling latch for securing said translating base in said storage position and releasing said translating base from said storage position.

8. The armrest of claim 7, wherein said deployable cup holder further includes a spring biasing said second section into said second position when said translating base is moved from said storage position to said deployed position.

9. A seat assembly, comprising:
a seat back;
a seat bottom;
an armrest, said armrest including a first portion, a second portion, a pivot joint connecting said first portion and said second portion, a body and a deployable cup holder carried on said body, said deployable cup holder including a translating base and an erectable well wall carried on and extending vertically from said translating base wherein said erectable well wall includes a first section fixed to said translating base and a second section pivotally attached to said translating base, said second section being displaceable between a first position nested with said first section and a second position opposed to said first section and forming a cup well between said first section and said second section;
a spring biasing said second section into said second position when said translating base is moved from a storage position to a deployed position;
a rotating base mounting said seat bottom to a frame of a motor vehicle; and
a toggling latch for securing said translating base in said storage position and releasing said translating base from said storage position.

* * * * *